No. 736,279. PATENTED AUG. 11, 1903.
W. LORENZ.
ROTARY TOOL FOR PLOWS.
APPLICATION FILED JAN. 23, 1903.
NO MODEL. 5 SHEETS—SHEET 4.
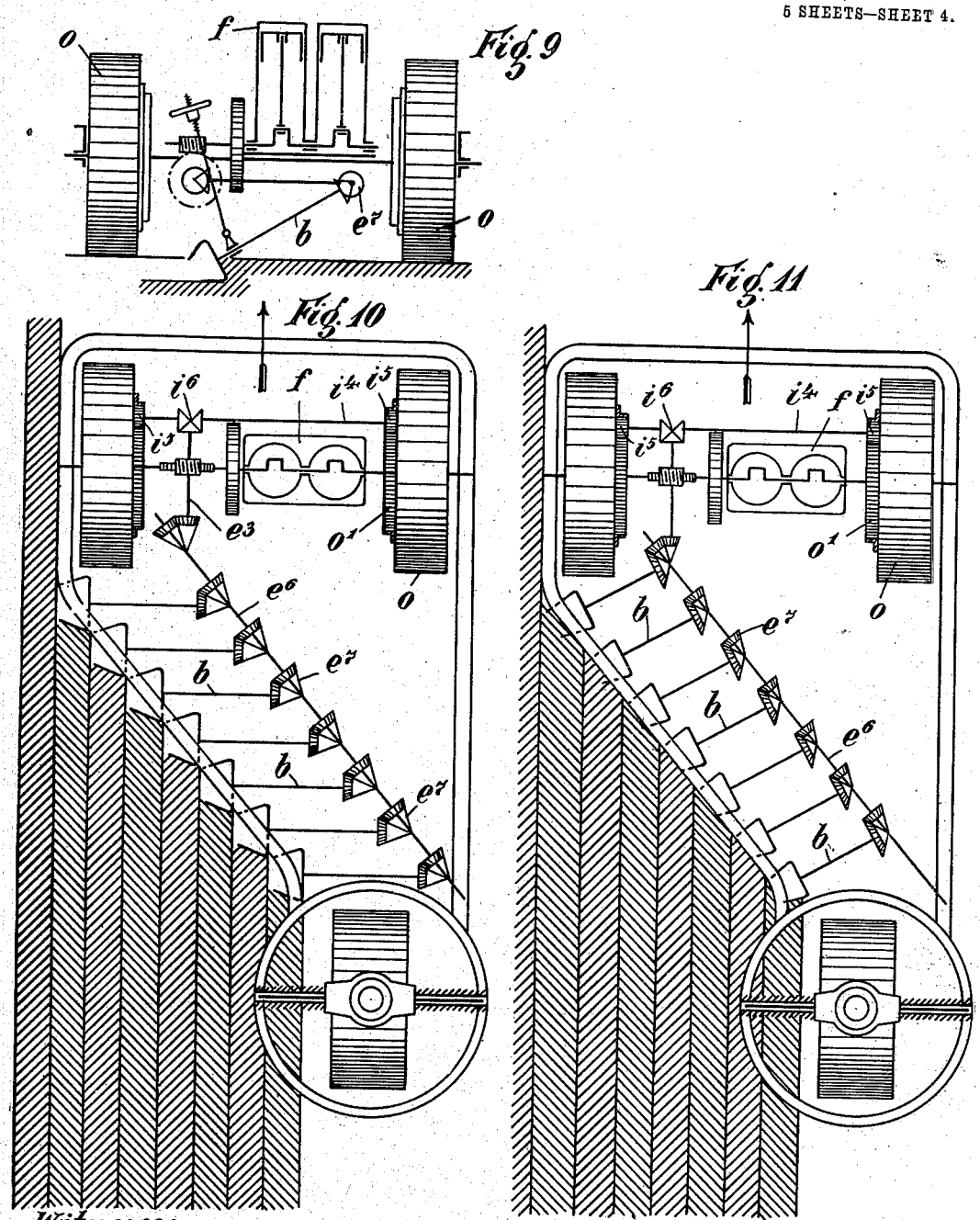
Witnesses:
Inventor:
Wilhelm Lorenz,
by his attorney

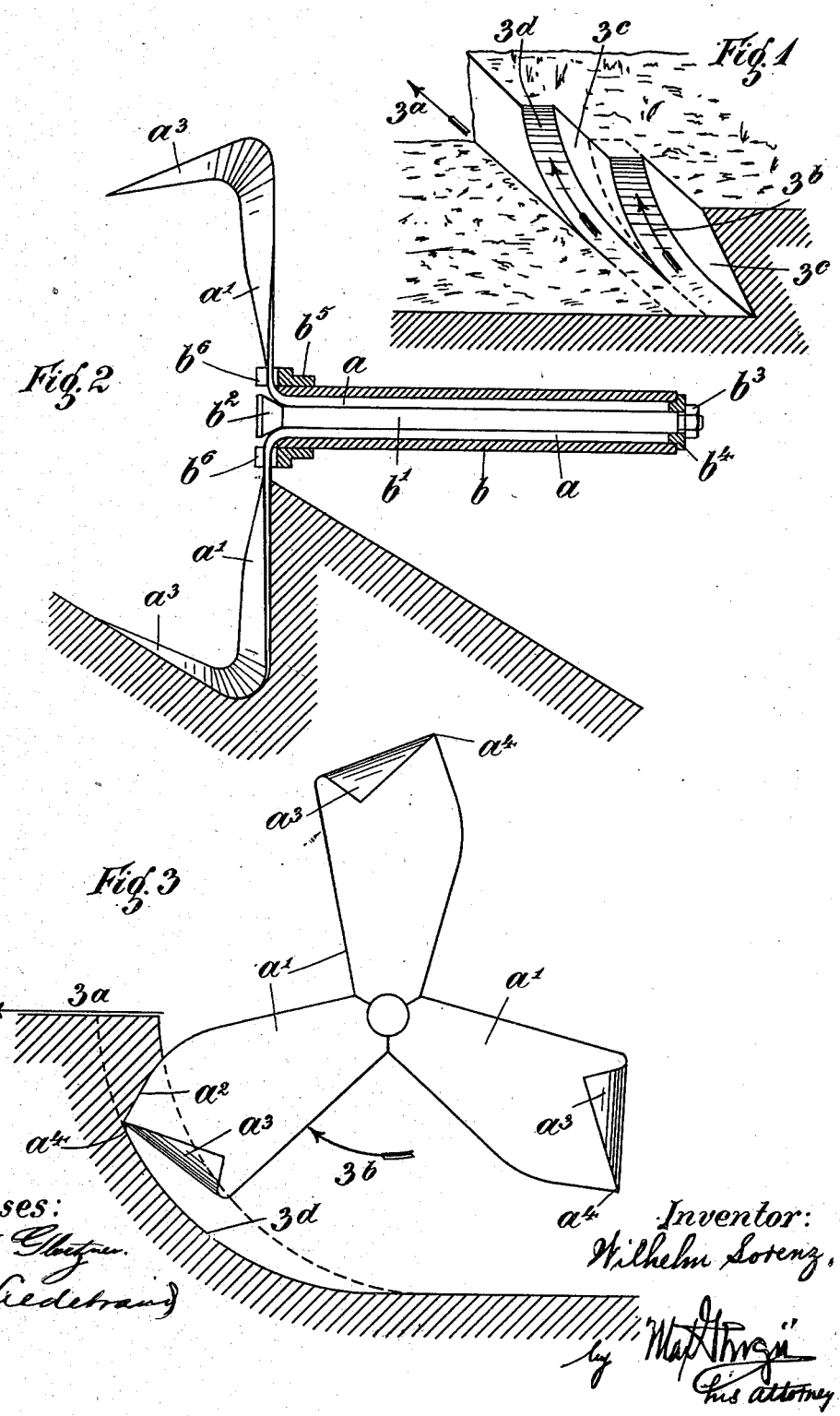

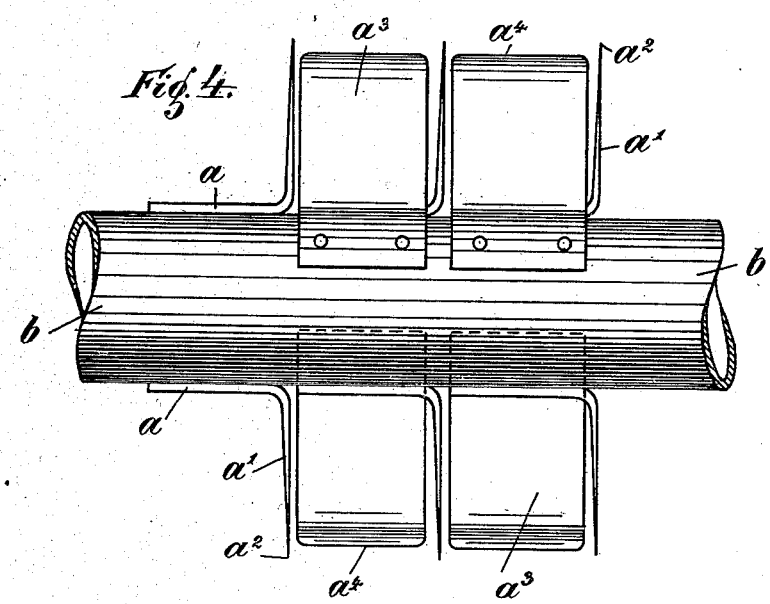
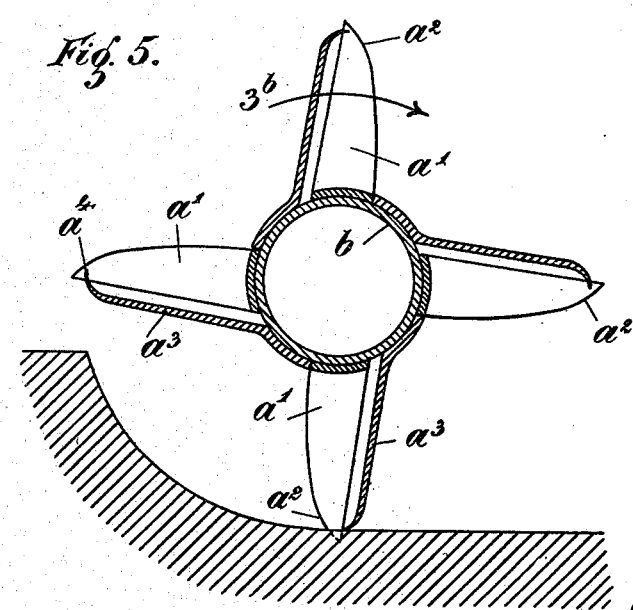

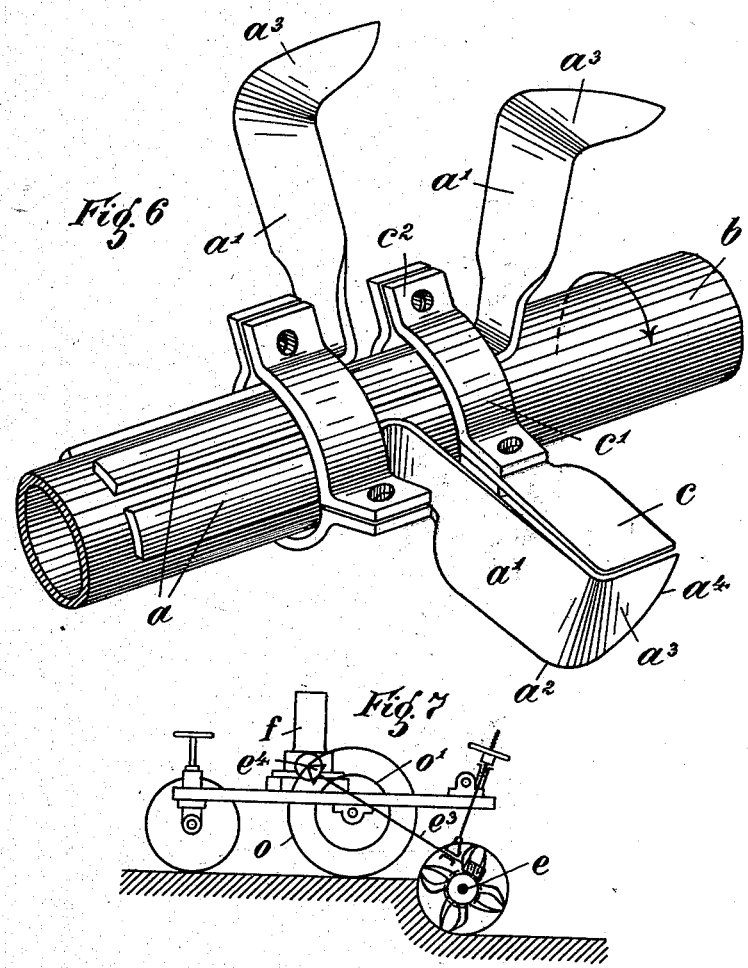
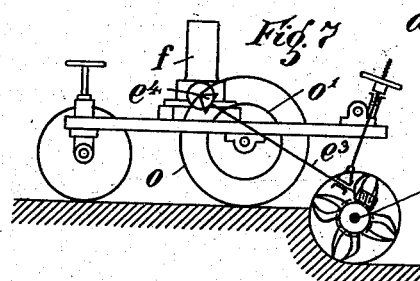
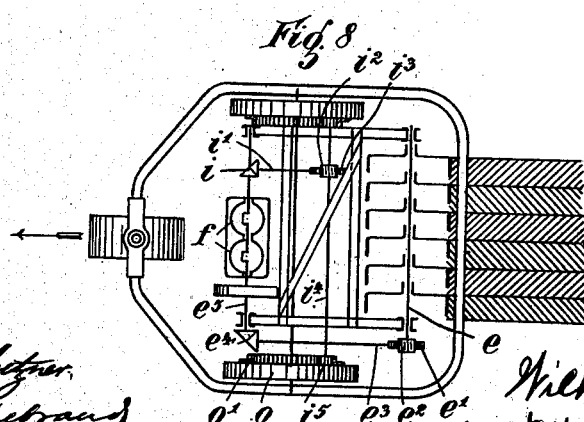

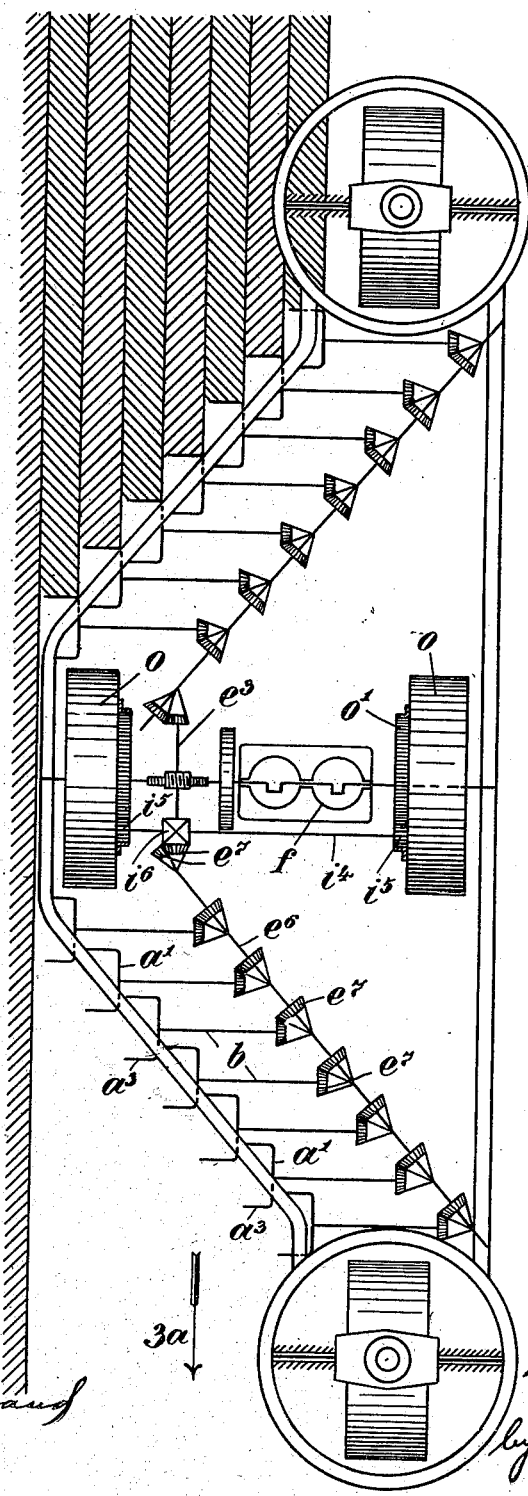

No. 736,279. Patented August 11, 1903.

UNITED STATES PATENT OFFICE.

WILHELM LORENZ, OF KARLSRUHE, GERMANY.

ROTARY TOOL FOR PLOWS.

SPECIFICATION forming part of Letters Patent No. 736,279, dated August 11, 1903.

Application filed January 23, 1903. Serial No. 140,300. (No model.)

*To all whom it may concern:*

Be it known that I, WILHELM LORENZ, civil engineer and manufacturer, a subject of the Grand Duke of Baden, residing at No. 57 Kriegstrasse, Karlsruhe, in the Grand Duchy of Baden, in the German Empire, have invented an Improvement in Plows, of which the following is a specification.

In ordinary plows in which the plowing-tool is moved in a straight line upon and through the soil, so as laterally to cut off continuous strips or beams of earth and turn them upside down, there arises a strong friction throughout the whole extent of the same, in consequence of which an excessive amount of power is consumed, particularly if the soil is heavy. Besides this disadvantage the employment of the plowing-tool in question is connected with the disadvantage that the continuous strip or beam of earth more or less prevents the air from permeating the ground or soil, although this depends to a certain extent, it is true, upon the nature of the latter. The same disadvantage and drawback are to be found in plows in which several plowing-tools are attached to a chain extending crosswise over the plows—*i. e.*, at right angles to the direction of movement of the same. Moreover, the furrows produced by the tools of such plows or machines are not continuous.

There have already been proposed plows with rotary tools which overcome certain objections common to the ordinary plow. The ventilating of the soil is with such machines better, it is true; but it is difficult to turn up the soil regularly and uniformly and produce at the same time rectilinear furrows. The consumption of power is also in these machines unnecessarily great.

Now the object of the present invention is to combine the advantage of the ordinary plow with that of the plow having rotary tools and avoiding at the same time the disadvantages or drawbacks common to them. I attain this object by an improved rotary tool the horizontal shaft of which is located about in the plane of the surface of the soil. The working parts proper of that tool consist of angular knives, of which the vertical portion acts as cutter and landside, whereas the other—*i. e.*, oblique portion—acts as share and moldboard.

Each portion may practically be considered as a separate knife, and, in fact, I may use separate vertical knives and separate horizontal knives, the former as landsides and cutters, the other as shares. The share-knives cut off in a direction from below to above comma-like pieces from the beam of soil, cut off in its turn by the other knife. The rear edge of the laterally-working knife is so shaped as to represent a moldboard for effecting the turning up of the beams of soil. This improved tool operates in general like the tool of an ordinary plow in that it cuts off a beam from the soil and forms thereby a rectilinear furrow. That beam, however, is not turned up as a whole, but only after it has been divided or separated into parts or portions of comma-like shape. In this way the soil is not only turned up, but also ventilated, and the consumption of power is considerably less, because the turning up of the small comma-like portions of soil is by far easier than with an uninterrupted or undivided strip. Moreover, the work is facilitated also by the direction of movement of the knives—viz., from below to above. With a damp soil of a loamy nature it may occur that the soil adheres to the tools and does not consequently leave the moldboard after having been turned up by the same. In such a case instead of an ordinary rigid knife an elastic knife is made use of, which while cutting the soil off is first put under tension and then rebounds, so as to cause the soil to be thrown off.

In order to make my invention more clear, I refer to the accompanying drawings, in which like characters denote similar parts throughout the several views, and in which—

Figure 1 is a perspective view of a small portion of soil worked with my improved rotary tool, the cut-off comma-shaped parts being omitted. Fig. 2 is a rear view of one form of construction of the improved tool. Fig. 3 is a side view of said tool, the hatched parts below being furrows in the soil. Fig. 4 is a representation of another form of construction of my improved tool. Fig. 5 is a side view of the parts shown in Fig. 4. Fig. 6 is a perspective view of a third form of construction. Fig. 7 is a side view of a plow provided with my improved tools. Fig. 8 is a plan of said machine. Fig. 9 is a front view of another form of construction of the plowing-machine. Fig. 10 is a plan of the same. Fig. 11 is a plan of a slightly-modified form of construction. Fig. 12 is a plan of two machines combined.

Referring to Figs. 2 and 3, the rotary tool consists in the example shown of three knives of somewhat angular shape, each knife consisting of a portion $a'$, extending rectangularly to its shank $a$, and of a portion $a^3$, extending in an acute angle from the end of the portion $a'$ and being made integral therewith. The particular shape of these portions $a'$ $a^3$ is distinctly represented in Figs. 2 and 3. The shanks $a$ are flat and are located in a hollow shaft $b$, in which they are fastened by a bolt $b'$, having at one end a conical head $b^2$ and at the other end a nut $b^3$, screwed home upon a disk $b^4$, closing the shaft $b$. The other end of the shaft has a ring $b^5$, with projections $b^6$, affording another security against the knives $a'$ $a^3$ turning around their shanks $a$. There are usually a series of such tools working at a time. (See Figs. 8, 10, 11, 12.) The shafts $b$ extend generally rectangularly to the direction of movement of the plow, (see Figs. 8, 10, 12;) but sometimes an oblique position may be preferred. (See Fig. 11.) The several tools of a machine may have each its own shaft, (see Figs. 10, 11, 12,) or one shaft may be common to them all. (See Fig. 8.) In every case, however, the shafts are located about in the plane of the surface of the soil. (See Figs. 3, 7.) While the plow moves over the soil in the direction of the arrow $3^a$, Fig. 3, the knives rotate in the direction of the arrow $3^b$, and the edge portion $a^2$ of the knife $a'$ cuts vertically into the soil, (producing a vertical surface, such as $3^c$, Fig. 1,) whereas the edge $a^4$ of the knife $a^3$ produces a curved surface $3^d$, Figs. 1 and 3, the main part of the knife lifting at the same time the comma-shaped piece of soil and turning it up. There are thus produced three commas at one rotation of the rotary tool; but instead of three knives one or two or four, &c., may be employed. This depends on the nature of the soil.

In the form of construction shown in Figs. 4 and 5 the knives $a'$ and $a^3$ do not consist of one piece, but are separated one from the other. The shanks $a$ of the knives $a'$ are riveted to the outer surface of the shaft $b$, as are also the knives $a^3$. The operation of the edges $a^2$ $a^4$ is the same as in the first construction, the edges $a^2$ cutting vertically into the soil and the edges $a^4$ cutting a curved surface lying at substantially right angles to that produced by the other knife. The knives $a^3$ are preferably made resilient, so that they yield a little while being forced through the soil and rebound as soon as they leave the same.

The knives shown in Fig. 6 resemble those of Figs. 2 and 3; but there is besides the knives a plate $c$, taking into the angle formed by and between the portions $a'$ and $a^3$ of the knife. This plate has the same object as the knife $a^3$ of Figs. 4 and 5 in so far at least as the transportation of the cut-off piece of soil is concerned, whereas the cutting off at the bottom is effected not by the plate $c$, but by the edge $a^4$ of the knife portion $a^3$. The knives are fastened to the shaft $b$ by means of a ring $c'$, consisting in the example shown of three parts connected by lugs $c^2$ with each other, as well as with the plates $c$. The ring $c'$ serves also for fastening—i. e., clamping—the shanks $a$ to the shaft $b$. Also in this case the plate $c$ may be resilient, the purpose being the same as before described.

Figs. 7 and 8 represent a plow in which six of the rotary tools of the kind shown in Figs. 2 and 3 are attached to a common shaft $e$. The latter has at one end a worm-wheel $e'$, which is in gear with a worm $e^2$, fixed to a shaft $e^3$. This shaft is connected by bevel-wheels $e^4$ with a shaft $e^5$, driven by a motor $f$. This motor serves also for driving the plow forward. Bevel-wheels $i$ connect the shaft $e^5$ with a shaft $i'$, having a worm $i^2$. The latter gears with a worm-wheel $i^3$, fixed to a shaft $i^4$. Cog-wheels $i^5$, secured to the ends of the shaft $i'$, gear with circular racks $o'$, fixed to the wheels $o$ of the machine.

In the plow shown in Figs. 9 and 10 each of the rotary tools has a shaft $b$ of its own and all the tools are arranged in step-like order or succession one after the other. The shafts $b$ have an oblique position with respect to the surface of the soil, (see Fig. 9,) as well as with respect to a shaft $e^6$, (see Fig. 10,) with which the shafts $b$ are geared by bevel-wheels $e^7$. A similar pair of bevel-wheels connects the shafts $e^6$ and $e^3$ with each other. The shaft $e^3$ is connected also with the shaft $i^4$ by three bevel-wheels $i^6$. The shafts $b$ extend rectangularly to the direction of movement of the plow; but they may have in this respect an oblique position, as shown in Fig. 11. Two machines of this kind or of that shown in Fig. 10 may be built into one, so as to have common driving-wheels $o$, Fig. 12. Such a double plow need not be reversed when changing the direction.

Having now described my invention, what I desire to secure by Letters Patent of the United States is—

1. In a plow, a rotary shaft, a plurality of knives mounted radially thereon and having cutting edges adapted to produce an L-shaped cut below the surface of the soil.

2. In a plow, a rotary shaft, a plurality of knives mounted radially thereon and having cutting edges adapted to produce an L-shaped cut from below toward the surface of the soil.

3. In a plow, a rotary shaft, a plurality of knives mounted radially thereon and having cutting edges adapted to produce an L-shaped cut extending from a point adjacent to the shaft vertically in the soil and horizontally below the surface thereof.

4. In a plow, a rotary shaft, a knife mounted radially thereon and adapted to produce a cut into the soil, and another knife adapted to produce a cut below the surface of the soil at an angle to the cutting plane of the first knife.

5. In a plow, a rotary shaft, a plurality of knives mounted radially thereon, one set of knives having cutting edges lying in a common plane, and another set having cutting edges disposed at an angle to the plane of the first set.

6. In a plow, a rotary shaft, a plurality of knives mounted radially thereon, one set of knives having cutting edges extending from a point adjacent to the shaft and lying in a common plane, and another set having cutting edges disposed at a distance from the shaft substantially equal to the length of the first knives and at an angle to the plane of the first set.

7. In a plow, a rotary shaft, a plurality of knives mounted radially thereon and having cutting edges adapted to produce an L-shaped cut, and a plurality of plates mounted on the shaft and taking into the angle formed by the cutting edges of the knives.

8. In a plow, a rotary shaft, a plurality of sets of knives mounted thereon, one set having cutting edges extending radially from the shaft in a common plane, and another set comprising plates having cutting edges disposed at an angle to the plane of the first set.

9. In a plow, a plurality of shafts each having a plurality of knives mounted radially thereon and provided with cutting edges adapted to produce an L-shaped cut below the surface of the soil, means for rotating said shafts, and means for moving the same longitudinally of the surface of the soil.

10. In a plow, a rotary shaft, a plurality of knives having shanks extending at the angle to the cutting edge, and means for securing the shanks to the shaft in such a manner that the cutting edges of the knives will extend radially from the shaft.

11. In a plow, a rotary shaft, a plurality of knives having cutting edges adapted to produce an L-shaped cut, a band passing around the shaft and shanks of the knives and serving to secure the same together, and plates secured to the band and taking into the angle formed by the cutting edges of the knives.

In witness whereof I have hereunto set my hand in presence of two witnesses.

WILHELM LORENZ.

Witnesses:
WILHELM MAYBACH,
ERNST ENTENMAN.